(12) United States Patent
Girotto

(10) Patent No.: US 11,685,252 B2
(45) Date of Patent: Jun. 27, 2023

(54) SUSPENSION AND TRACTION SYSTEM FOR VEHICLES

(71) Applicant: TEXA DYNAMICS S.R.L., Monastier di Treviso (IT)

(72) Inventor: Adriano Girotto, Monastier di Treviso (IT)

(73) Assignee: TEXA DYNAMICS S.R.L., Monastier di Treviso (IT)

( * ) Notice: Subject to any disclaimer, the term of this patent is extended or adjusted under 35 U.S.C. 154(b) by 429 days.

(21) Appl. No.: 17/047,119

(22) PCT Filed: Apr. 10, 2019

(86) PCT No.: PCT/IB2019/052935
§ 371 (c)(1),
(2) Date: Oct. 13, 2020

(87) PCT Pub. No.: WO2019/198000
PCT Pub. Date: Oct. 17, 2019

(65) Prior Publication Data
US 2021/0197658 A1 Jul. 1, 2021

(30) Foreign Application Priority Data
Apr. 11, 2018 (IT) .......................... 102018000004377

(51) Int. Cl.
*B60K 7/00* (2006.01)
*B60G 3/20* (2006.01)
(Continued)

(52) U.S. Cl.
CPC .............. *B60K 7/0007* (2013.01); *B60G 3/20* (2013.01); *B60G 17/00* (2013.01); *B60K 17/046* (2013.01); *H02K 7/006* (2013.01); *H02K 7/116* (2013.01); *H02K 16/02* (2013.01); *B60G 2200/17* (2013.01); *B60G 2204/421* (2013.01); *B60G 2300/50* (2013.01); *B60K 2007/003* (2013.01); *B60K 2007/0053* (2013.01); *B60K 2007/0061* (2013.01)

(58) Field of Classification Search
CPC ................ B60K 7/0007; B60K 17/046; B60K 2007/003; B60K 2007/0053; B60K 2007/0061; B60G 3/20; B60G 17/00; B60G 2200/17; B60G 2204/421; B60G 2300/50; H02K 7/006; H02K 7/116; H02K 16/02
See application file for complete search history.

(56) References Cited

U.S. PATENT DOCUMENTS 5,443,130 A * 8/1995 Tanaka .................. H02K 7/116
180/65.6
10,377,221 B2 * 8/2019 Holmes .................. B60K 6/445
(Continued)

*Primary Examiner* — Erez Gurari
(74) *Attorney, Agent, or Firm* — Mark M. Friedman

(57) ABSTRACT

A suspension and traction system (MC) is described for vehicles equipped with a frame and a propulsive element (R), which by rolling on the ground (T) is adapted to move the vehicle relative to the ground (T).

Figure 1:
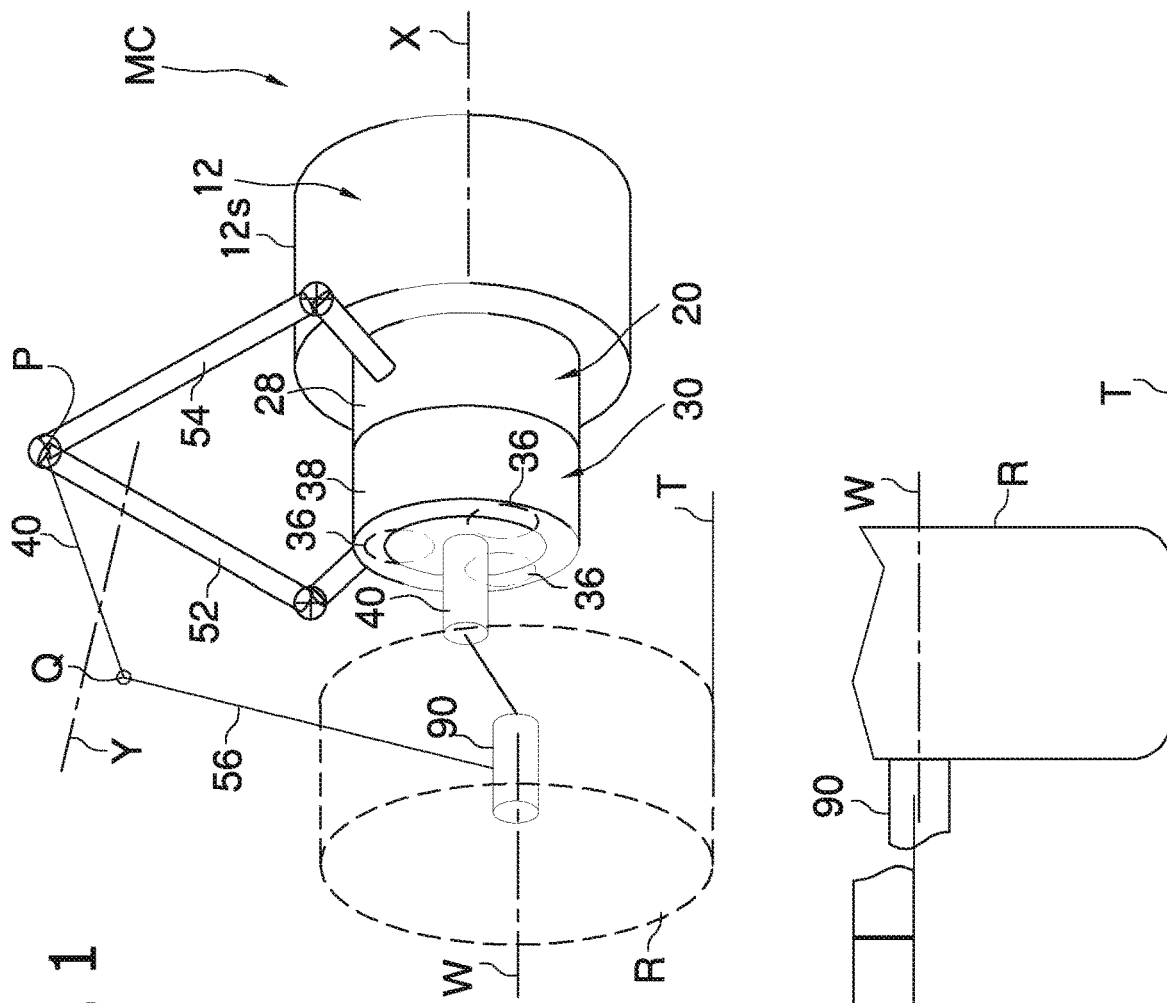

A rotary electric motor (12) operates two rotors (14, 16) independently controllable from one another to supply two epicycloidal mechanisms (20, 30) whose outer ring gears (28, 38) are independently movable to rotate about the respective solar gear (24, 34) and rigidly connected substantially to a same point (P) of the frame.

10 Claims, 1 Drawing Sheet

(51) Int. Cl.
   *B60G 17/00*   (2006.01)
   *B60K 17/04*   (2006.01)
   *H02K 7/00*    (2006.01)
   *H02K 7/116*   (2006.01)
   *H02K 16/02*   (2006.01)

(56) References Cited

U.S. PATENT DOCUMENTS

| | | | | |
|---|---|---|---|---|
| 10,876,596 | B1* | 12/2020 | Bonny | F16D 65/186 |
| 2004/0163409 | A1* | 8/2004 | Nakajima | B60L 3/0061 |
| | | | | 62/505 |
| 2008/0258569 | A1* | 10/2008 | Kano | B60K 6/365 |
| | | | | 310/51 |
| 2012/0015772 | A1* | 1/2012 | Kira | B60K 6/442 |
| | | | | 903/910 |
| 2012/0103708 | A1* | 5/2012 | Hennings | B60K 7/0007 |
| | | | | 180/65.6 |
| 2012/0258831 | A1* | 10/2012 | Knoblauch | B60K 7/0007 |
| | | | | 475/5 |
| 2012/0271496 | A1* | 10/2012 | Yamamoto | B60K 17/043 |
| | | | | 180/65.265 |
| 2012/0277059 | A1* | 11/2012 | Akutsu | B60W 30/025 |
| | | | | 180/65.265 |
| 2012/0283061 | A1* | 11/2012 | Karlsson | B60L 15/2054 |
| | | | | 475/150 |
| 2014/0349812 | A1* | 11/2014 | Hiyoshi | F16H 3/44 |
| | | | | 477/6 |
| 2019/0248247 | A1* | 8/2019 | Yamaguchi | B60K 1/02 |
| 2019/0359197 | A1* | 11/2019 | Kaimer | B60K 17/046 |
| 2021/0031615 | A1* | 2/2021 | Li | B60K 7/0007 |
| 2021/0252972 | A1* | 8/2021 | Engerman | B60L 15/2054 |
| 2021/0283970 | A1* | 9/2021 | Moriarty | B60G 15/062 |
| 2022/0048347 | A1* | 2/2022 | Bifano | B60K 7/0007 |

* cited by examiner

SUSPENSION AND TRACTION SYSTEM FOR VEHICLES

The invention relates—in general—to a traction and suspension system, particularly in wheeled electric vehicles.

In recent latest-generation electric vehicles, see e.g. WO2015155670, two electric motors are controlled independently of each other not only to give propulsive torque to a wheel but also to vary the distance thereof from the vehicle frame.

WO2015155670 describes as a specific example a motorized wheel, while in some applications it is preferable to install the electric motors on the frame, e.g. to simplify the construction of the vehicle. Therefore it would be useful to develop an embodiment of WO2015155670 for this case. Moreover, the system in WO2015155670 experiences difficulties if one wishes to integrate it in existing frame structures.

Therefore it is desired to propose a development of WO2015155670 to remedy one or more of these problems, with a system and/or method as in the attached claims, in which the dependent ones define advantageous variants.

In particular, there is presented a suspension and traction system for a vehicle equipped with a frame and a propulsive element, which by rolling on the ground (e.g. a wheel or track) is adapted to move the vehicle with respect to the ground, comprising:
  a rotary electric motor comprising
    two rotors that can be controlled independently of each other and are rotatable with respect to a stator fixed on the frame, wherein the rotors preferably have a common rotation axis,
  two epicycloidal mechanisms each comprising
    a central solar gear, meshing with satellite gears, which in turn mesh with an outer ring gear;
  wherein in each epicycloidal mechanism one among the solar gear and the satellite gears is coupled, respectively, to a rotor and the other between the solar gear and the satellite gears is connected/connectable to the propulsive element to impart it equiverse angular torque in order to propel the vehicle on the ground, and
    the two outer ring gears are
    movable independently to rotate about the respective solar gear and with respect to the frame) and
    rigidly connected substantially to a same point external to the epicycloidal mechanisms,
  wherein at said point a thrust, determined by the coordinated angular displacement of the ring gears about the solar gears, can be imparted.

Through the torque control impressed by a rotor to the respective toothed ring gear, that ring gear can be rotated by a desired angle, independently of the other ring gear, and about the rotation axis of the solar gears. E.g. a toothed ring gear can be rotated by a desired angle, and the other ring gear by an equal and opposite angle.

The thrust determined by the coordinated angular displacement of the ring gears about the solar gears can be discharged on the frame and/or axle of the propulsive element.

Preferably the rotation axes of the solar gears of both epicycloidal mechanisms coincide.

Thus a force is produced on said point, which can be used to modify the suspension, e.g. to vary the distance between said point and the propulsive element. The general principle is the one expressed in FIG. 2 of WO2015155670, included here as a reference and to it we refer back.

The ring gears can be rotated independently of each other (preferably one in a clockwise direction and one in a counter-clockwise direction, i.e. with opposite angular directions).

Preferably there is a transmission (or transmission means or elements) for transmitting the thrust generated on said point to the propulsive element.

The two rotors are controlled, via an electronic control unit, both for transferring torque to the propulsive element through the two epicycles, and for regulating the height or distance (e.g. with respect to the ground or to the propulsive element) of the frame. In particular the two rotors are controlled, through the electronic control unit, for adjusting the height or distance between said point and the propulsive element, more particularly for adjusting the height or distance between said point and the rotation axis of the propulsive element and/or the rotation axis of the rotors.

Being the ring gear of an epicycloidal mechanism movable angularly with respect to the respective rotor which carries torque to that epicycloidal mechanism, the angular position of each ring gear can be adjusted about the respective solar gear (and also with respect to the rotation axis of the rotors), e.g. by controlling the torque impressed by a stator on its rotor. Adjusting the position of each ring gear results in a position or level adjustment of said point, and therefore of the frame with respect to the propulsive element. Indeed when the thrust generated on said point is transferred to the propulsive element, by reaction the frame moves away from the propulsive element.

Note that, to produce a force on said point, it is also possible:
  to move a single ring gear about its rotation axis, which coincides with the rotation axis of the respective solar gear; and/or
  to move in the same angular direction the two toothed ring gears about said rotation axis.

Said point may be a same point on the frame or a point coupled with the frame so as to transfer to the frame a force generated by the ring gears. E.g. said point may in turn be movable along a path predefined by constraints with respect to the frame, in particular said point may be constrained to slide along a direction orthogonal to the rotation axis of the ring gears.

With the configuration defined above, the stator of the electric motor remains motionless with respect to the frame, and it is possible to equip such electric motor with the control and/or power electronics by fixing the latter directly to the casing of the stator.

An advantage is then to shorten and simplify the electrical connections.

Another advantage is the simplification of the cooling system of the motor and the power electronics, and a stator fixed with respect to the frame allows optimization thereof.

Said electric motor may comprise two driving elements, each one with stator and rotor separated and independent of each other, or may comprise a common stator for the two rotors, however separated and independent of each other.

Other important advantages of the system are that it allows to equip the vehicle with active suspensions, able to adapt its balance to the road and driving conditions, and that it can easily be integrated into the most common suspension standards allowing it to be installed on new or existing vehicles.

Preferably the rotors are coaxial to each other, in particular arranged one inside the other. A preferred construction is then that the rotors comprise or consist of two sleeves, one inserted rotatably into the other.

Preferably each rotor is connected to the solar gear of a epicycloidal mechanism, and the satellite gears are connected to the propulsive element.

Preferably the satellite gears of the two epicycloidal mechanisms are connected to a common element, in turn connected with the propulsive element.

In particular, said common element comprises a transmission shaft for carrying torque to the propulsive element. An advantage is that the stresses picked up by the propulsive element are not discharged on the epicycloidal mechanism. This effect is further improved if the transmission shaft comprises at least two segments connected to each other by a joint (e.g. a Cardan universal joint), and/or the rotation axis of the propulsive element is offset with respect to the rotation axis of the rotors and/or the solar gears. This allows placing the electric motors at points being more protected and/or easily couplable to on-board electronics.

Another advantage is that, when starting or accelerating the vehicle, the system can achieve a surprising dynamic effect. By controlling the electric motors so that, simultaneously, the rotors impart rotary torque to the propulsive element and the ring gears move to generate on the propulsive element a force directed towards the ground, initial adherence of the propulsive element on the ground is greatly improved. Therefore the vehicle can accelerate without the propulsive element skating or skidding.

The same can occur during braking, during which the electric motors can be controlled so that the ring gears move to generate on the propulsive element a force directed towards the ground. This increases the adherence of the vehicle during braking.

In sum, with the aforementioned control it is possible to generate a force which, when the vehicle is stationary or in motion or during acceleration or braking, pushes the propulsive element not only tangentially but also orthogonally to the ground. The same phenomenon occurs naturally in very fast predatory felines, such as the cheetah, which accelerates by pushing the hind legs not only backwards but also towards the ground.

Another advantage of the system is the possibility of housing on the propulsive element a safety or parking disc brake, because the driving organs are external to the propulsive element.

The system also works with the propulsive element being still, thanks to the reaction forces impressed by the rotors on the (still) ring gears.

The transmission to transmit the thrust generated by the ring gears on said point to the propulsive element, may have many embodiments.

The transmission may be structured so that the thrust preferably generates also a displacement of said point, which can be exploited for moving the propulsive element through ropes or chains with appropriate transmissions. In another embodiment, the transmission comprises a fluid, whose compression is obtained through the generated thrust. The increase in pressure can be used for moving the propulsive element, e.g. via a hydraulic piston.

The transmission for transmitting the thrust is preferably structured so as to invert the direction of the thrust generated on said point in order to direct it towards the propulsive element. Also, for this purpose and for constructive simplicity's sake, preferably said transmission comprises a lever pivoted on the frame, the lever comprising an application point for said generated force and a force transmission point towards the propulsive element, so that when said generated force moves the application point the lever moves the force transmission point.

In particular the lever comprises an oscillation axis which is fixed with respect to the frame, so that the lever is oscillating (e.g. like a rocker arm) compared to the frame. Preferably the oscillation axis of the lever is intermediate to said application point for said generated force and to said force transmission point towards the propulsive element. In this way the lever is able to reverse the direction of movement of the application point facilitating the transmission of force towards the propulsive element.

In particular, the lever is connected to the ring gears through two respective rigid arms, wherein each rigid arm has a point or end connected to one ring gear and a point or end connected to the lever.

In particular, said point is connected to the ring gears through two respective rigid arms, wherein each rigid arm has a point or end connected to one ring gear and a point or end connected to said point.

In particular, the oscillation axis of the lever is substantially orthogonal to a vertical plane passing through said transmission shaft and/or for the rotors' rotation axis.

In particular, the propulsive element is connected to the lever by a rigid arm.

A method is also proposed for varying the distance of a vehicle frame from a vehicle's propulsive element rolling on the ground, wherein an electric motor is mounted on the vehicle, comprising two coaxial rotors rotatable with respect to a stator fixed on the frame, the rotation axis of the rotors being fixed with respect to the frame of the vehicle and preferably coincident;

the rotors being connected to transfer torque to a respective epicycloidal mechanism comprising a central solar gear, which engages with satellite gears, which in turn engage an outer ring gear capable of rotating with respect to the frame;

in order to impart, through the epicycloidal mechanisms, an angular torque in the same direction as the propulsive element's, e.g. via a transmission shaft, the ring gears being rigidly connected substantially to a same point external to the epicycloidal mechanisms;

the method comprising the steps of controlling the torque imparted by the rotors to rotate each ring gear about the respective solar gear for exerting a thrust on said point; and transmitting the thrust generated on said point to the propulsive element.

The variants described herein for the system are also variants of the steps of the method, and for brevity's sake they will not be repeated.

Preferably in said method there is the further step of controlling the rotors so that they exert a rotary torque on the propulsive element and at the same time the ring gears transmit a force on the propulsive element to push it towards the ground.

It is understood that preferably the components of the system, in particular the torque delivered by the rotors to the epicycloidal mechanisms, are controlled by a control unit or electronic unit. In particular the control unit or electronic unit comprises a programmable microprocessor to perform the methods defined herein and/or one or each of the actions described herein for the system.

Another aspect of the invention is a software program whose instructions, executed by a microprocessor, carry out the steps of one of the methods and/or one or each action defined here for the system.

Figure 2:
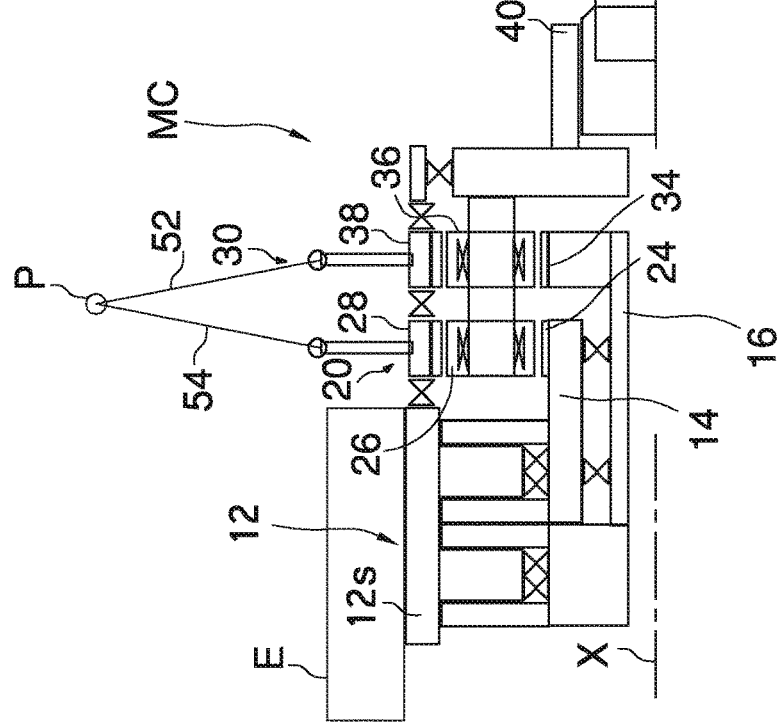

The advantages of the invention will be clearer from the following description of a preferred embodiment of a suspension and traction system, reference making to the annexed drawing in which FIG. 1 shows a schematic three-dimensional principle view of a system:

FIG. 2 shows a vertical cross-section view of the diagram of FIG. 1.

The shown system MC serves to rotate a propulsive element in the form of a wheel R. The wheel, R, by rolling on a terrain T, moves an associated vehicle (not shown). The system MC is e.g. replicated on all the wheels of the vehicle.

The system MC comprises a rotary electric motor 12 formed by a common stator 12s and two independent rotors 14, 16. The electrical part of the motor 12 is e.g. of a known type.

The rotors 14, 16 are coaxial and have a common rotation axis indicated with X. The X axis is fixed with respect to the vehicle frame.

The rotors 14, 16 are also mounted one inside the other (for example, they are two concentric sleeves), and carry torque to the motor to, respectively, a solar gear 24 and a solar gear 34, each belonging to a respective epicycloidal mechanism 20, 30.

The epicycloidal mechanism 20 (30) comprises, in a known manner, a central solar gear 24 (34), which meshes with satellite gears 26 (36), which in turn mesh on an outer ring gear 28 (38).

The epicycloidal mechanism 20 is independent and separate from the epicycloidal mechanism 30. In particular the ring gears 28, 38 are able to rotate with respect to the frame about the X axis independently of each other (i.e. they are not fixed to the vehicle frame).

The satellite gears 26, 36 are all integrally pivoted on a support 40, which is connected to the wheel R through a shaft 90 to transfer torque to it.

Each ring gear 28, 38 is connected to a respective rigid arm 52, 54, and the arms 52, 54 are connected to a common point P external to the epicycloidal mechanisms 20, 30.

Point P belongs, or is connected directly, to the frame, or at the end of a lever 40 which is oscillating, approximately at its center, about an axis Y fixed with respect to the vehicle frame. The other end of lever 40 (point Q) is connected to the wheel R (for example to the shaft 90) through e.g. a rigid arm 56.

The rotation of the satellite gears 26, 36 about the X axis, pushed by the rotors 14, 16, rotates the wheel R.

By controlling the electric power supply of the rotors 14, 16 in the electric motor 12 (i.e. by giving more or less power than that required by the wheel R) it is possible to move the ring gears 28, 38 simultaneously about the X axis, one in clockwise direction and one counter-clockwise.

E.g. the arms 52, 54 may be made to rise and push the point P upwards (in this case the point P moves away from the X axis). The lever 40 then rotates about the Y axis and moves the point Q downwards. It follows that the arm 56 pushes the wheel R downwards and towards the ground, obtaining among others a variation of the distance between the W and X axes, which are parallel in the example. In the example, the Y axis is orthogonal to an imaginary vertical plane passing through X (and/or W).

One can get an upward movement of the wheel R by reversing all the motions described for the previous case (the point P approaches the X axis).

Note that the rotary torque applied to the wheel R by the rotors 14, 16 and the force imparted to the wheel R towards the ground by the ring gears 28, 38 are independently controllable quantities. Then it is e.g. possible, during the acceleration phase, to push the wheel R further towards the ground to increase its gripping.

The electric power supply of the motor 12 can be e.g. obtained through inverters or power-electronics stages of known topology. An electronic control unit E will take care of properly controlling the inverters or power-electronics stages so as to control the rotation speed of the wheel R and the height of the point P and Q.

The electronic control unit E is easily mounted on the stator 12s, close to the windings to be powered.

On the shaft 90 it is preferable to mount at least one joint, for example a. Cardan joint, for allowing or facilitating the offset of the W and X axes and/or a different orientation of the W axis.

Each ring gear 28, 38 may be connected to the point P also by means other than the arms 52, 54, and the point P does not necessarily represent a geometric point, being able to be—for mechanical needs—an extended element to which the ring gears 28, 38 are connected at slightly spaced points.

The lever 40 may be oscillating at a point other than its center, and the Y axis fixed with respect to the frame may be obtained e.g. by simple pivoting.

The arrangement of the points Q and P on the lever 40 may vary too, as well as the means for transferring, from the point Q to the wheel R, the force generated upon displacing the ring gears 28, 38.

The invention claimed is:

1. Suspension and traction system (MC) for vehicles equipped with a frame and a propulsive element (R), which by rolling on the ground (T) is adapted to move the vehicle relative to the ground (T), comprising:
   a rotary electric motor (12) comprising two rotors (14, 16) independently controllable from one another and rotatable with respect to a stator (12s) fixed on the frame, wherein the rotors (14, 16) preferably have a common rotation axis (X),
   two epicycloidal mechanisms (20, 30) each comprising a central solar gear (24, 34), meshing with satellite gears (26, 36), meshing in turn with an outer ring gear (28, 38);
   wherein in each epicycloidal mechanism one among the solar gear (24, 34) and the satellite gears (26, 36) is coupled, respectively, to a rotor (14, 16) and the other among the solar gear (24, 34) and the satellite gears (26, 36) is connected/connectable to the propulsive element (R) to impart to it equiverse angular torque to propel the vehicle on the ground (T),
   and the two outer ring gears (28, 38) are independently movable to rotate about the respective solar gear (24, 34) and rigidly connected substantially to a same point (P) outside the epicycloidal mechanisms,
   wherein on said point (P) a thrust, determined by the coordinated angular displacement of the ring gears (28, 38) about the solar gears (24, 34), can be imparted.

2. System (MC) according to claim 1, wherein the rotation axis (X) of the solar gears (24, 34) of both epicycloidal mechanisms coincides.

3. System (MC) according to claim 1, comprising an electronic control unit configured to control the two rotors (14, 16) so that they transfer torque to the propulsive element (R) through the two oidalal mechanisms, and adjust the height or distance between said point (P) and the propulsive element (R) by imposing a predetermined angular position to each ring gear (28, 38) with respect to its own solar gear (24, 34).

4. System (MC) according to claim 1, wherein said point (P) is fixed on the frame or in turn movable along a trajectory predefined by constraints with respect to the frame.

5. System (MC) according to claim 1, wherein said electric motor comprises a stator (12s) common for the two rotors (14, 16).

6. System (MC) according to claim 1, wherein the rotors (14, 16) are coaxial with each other.

7. System (MC) according to claim 1, wherein the rotors (14, 16) are arranged one inside the other.

8. System (MC) according to claim 1, wherein each rotor (14, 16) is connected respectively with the solar gear (24, 34) of an epicycloidal mechanism (20, 30), and the satellite gears (26, 36) are connected to the propulsive element (R).

9. System (MC) according to claim 1, comprising a transmission for transmitting the thrust from said point (P) towards the propulsive element (R), the transmission being structured to reverse the direction of the thrust generated on said point (P) in order to direct it towards the propulsive element (R).

10. System (MC) according to claim 1, wherein said point (P) is connected to the ring gears (28, 38) through two respective rigid arms (52, 54), wherein each rigid arm (52, 54) has a point or end connected to a ring gear (28, 38) and a point or end connected to said point (P).

* * * * *